(12) United States Patent
Li

(10) Patent No.: US 11,349,733 B2
(45) Date of Patent: May 31, 2022

(54) METHOD AND SYSTEM FOR AUTOMATIC DETECTION AND ALERT OF CHANGES OF COMPUTING DEVICE COMPONENTS

(71) Applicant: Quanta Computer Inc., Taoyuan (TW)

(72) Inventor: Yung-Fu Li, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 118 days.

(21) Appl. No.: 15/930,216

(22) Filed: May 12, 2020

(65) Prior Publication Data

US 2021/0297330 A1 Sep. 23, 2021

Related U.S. Application Data

(60) Provisional application No. 62/993,292, filed on Mar. 23, 2020.

(51) Int. Cl.
*H04L 43/06* (2022.01)
*G06F 9/4401* (2018.01)
*G06F 13/16* (2006.01)

(52) U.S. Cl.
CPC ............ *H04L 43/06* (2013.01); *G06F 9/4401* (2013.01); *G06F 13/1668* (2013.01)

(58) Field of Classification Search
CPC ..... H04L 43/06; G06F 9/4401; G06F 13/1668
See application file for complete search history.

(56) References Cited

U.S. PATENT DOCUMENTS

| | | | | |
|---|---|---|---|---|
| 2005/0267956 A1* | 12/2005 | Huang | ................. | H04L 41/0604 709/223 |
| 2010/0161772 A1* | 6/2010 | Nakamura | .......... | G06F 11/3013 709/221 |
| 2013/0198575 A1* | 8/2013 | Etaati | .................. | G06F 11/0751 714/47.1 |
| 2014/0122851 A1 | 5/2014 | Guo et al. | | |

(Continued)

FOREIGN PATENT DOCUMENTS

| | | |
|---|---|---|
| CN | 103746823 A | 4/2014 |
| CN | 103853636 A | 6/2014 |

(Continued)

OTHER PUBLICATIONS

TW Office Action for Application No. 109122808, dated Feb. 4, 2021, w/ First Office Action Summary.

(Continued)

*Primary Examiner* — Azizul Choudhury
(74) *Attorney, Agent, or Firm* — Nixon Peabody LLP

(57) ABSTRACT

A system and method for tracking the components of a computing device is disclosed. Each of the components of the computing devices includes identification data. At least one bus is coupled to the components. A memory device stores identification information corresponding with each of the components. A management controller is coupled to the bus and the memory device. The management controller periodically requests identification data from each of the components over the bus. The management controller receives the requested identification data from each of the components. The management controller compares the received identification data with the stored identification data to determine if any of the components has been replaced.

20 Claims, 4 Drawing Sheets

(56) References Cited

U.S. PATENT DOCUMENTS

2015/0106660 A1* 4/2015 Chumbalkar ......... G06F 11/328
                                                                    714/42
2018/0357108 A1* 12/2018 Mullender ............ G06F 3/0613
2019/0122015 A1*  4/2019 Huang ............... G06K 7/10475

FOREIGN PATENT DOCUMENTS

| CN | 104657243 | A | 5/2015 |
| CN | 104679619 | A | 6/2015 |
| TW | 201516753 | A | 5/2015 |
| TW | I677793 | B | 11/2019 |
| TW | I685740 | B | 2/2020 |

OTHER PUBLICATIONS

TW Search Report for Application No. 109122808, dated Feb. 4, 2021, w/ First Office Action.
CN Office Action for Application No. 2020107161955, dated Mar. 16, 2022, w/ First Office Action Summary.
CN Search Report for Application No. 2020107161955, dated Mar. 16, 2022, w/ First Office Action.

\* cited by examiner

METHOD AND SYSTEM FOR AUTOMATIC DETECTION AND ALERT OF CHANGES OF COMPUTING DEVICE COMPONENTS

PRIORITY CLAIM

This application claims priority under 35 U.S.C. § 119 to U.S. Provisional Application No. 62/993,292, filed on Mar. 23, 2020. The contents of that application are hereby incorporated by reference in their entirety.

TECHNICAL FIELD

The present disclosure relates generally to component detection in computing devices. More particularly, aspects of this disclosure relate to a system that allows for detection and alerting of changes in components in computing devices in a data center.

BACKGROUND

Servers are employed in large numbers for high demand applications, such as network based systems or data centers. The emergence of the cloud for computing applications has increased the demand for data centers. Data centers have numerous servers that store data and run applications accessed by remotely connected, computer device users. A typical data center has physical rack structures with attendant power and communication connections. Each rack may hold multiple computing servers and storage servers. Each server generally includes hardware components such as processors, memory devices, network interface cards, power supplies, and other specialized hardware. Each of the servers generally includes a baseboard management controller that manages the operation of the server, as well as communicating operational data to a central management station that manages the servers of the rack.

The servers in a data center facilitate many services for businesses, including executing applications, providing virtualization services, and facilitating Internet commerce. In this role, the application servers and storage servers in a data center store valuable data that must be protected. Thus, security of data centers is increasingly critical. One potential breach of security may be an unauthorized replacement of components on a server. Certain components on a server may include valuable access information that may be used to infiltrate the data center. Therefore, a component that is removed from a server may provide information to allow unauthorized access to the data center. Replacing the removed component though a hot swap allows the breach to be concealed as the server will continue to operate normally. Further, a component may also be replaced with another component having a "Trojan horse," such as malware, to gather sensitive data. The data center administrator may not have knowledge that a component in the server was replaced and therefore compromising security.

Thus, there is a need for a system that uses a management controller of a computing device, such as a server, to detect whether a component in the server was changed. There is a further need for a system that alerts data center administrators when a component in a server has been changed. There is a further need for a system that can track the components of a server from a remote central management station.

SUMMARY

One disclosed example is a system to determine components of a remote computing device. The system includes a remote management station and a network in communication with the remote management station. The system includes a computing device having components, a controller, and a memory. The memory has stored identification data for at least one of the components. The controller is coupled to the network and determines the identification data of at least one of the hardware components. The controller checks whether the component has been replaced by comparing the stored identification data with the determined identification data.

A further implementation of the example system is an embodiment where the controller is a baseboard management controller. Another implementation is where the computing device is a server. Another implementation is where the controller issues an alert when the component has been replaced. Another implementation is where the alert is one of an email, a text message, an IPMI PET (Platform Event Trap) protocol alert, or a SNMP trap protocol alert. Another implementation is where the alert may include one of a timestamp, an IP address of the controller, an ID of the computing device, the stored identification information of the component, the determined identification information of the component, or the location of the component in the computing device. Another implementation is where the system includes a BIOS. The stored identification data is provided by the BIOS collecting identification information from the component during an initial power-on of the computing device and sending the identification information to the controller. Another implementation is where the identification data is determined by the BIOS collecting identification information from the component during a subsequent power-on of the computing device. Another implementation is where stored identification data is provided by the controller collecting identification information from the component during an initial power-on of the computing device and storing the identification information to the memory. The controller collects identification information from the component during a subsequent power-on of the computing device. Another implementation is where the identification is one of a serial number, a part number, a model ID, a manufacturer name or ID, a manufacture date, or a location in the computing device. Another implementation is where the controller periodically repeats determining the identification data of at least one of the components and checking whether the component has been replaced.

Another disclosed example is a method of determining components on a computing device. The identification information of a component is stored in a memory. The identification information of the component is subsequently determined via a controller. The determined identification information of the component is compared with the stored identification information to determine if the component has been replaced.

Another implementation of the example method is where the controller is a baseboard management controller, and the computing device is a server. Another implementation is where an alert is issued when the component has been replaced. Another implementation is where the alert is one of an email, a text message, an IPMI PET (Platform Event Trap) protocol alert, or a SNMP trap protocol alert. Another implementation is where the alert may include one of a timestamp, an IP address of the controller, an ID of the computing device, the stored identification information of the component, the determined identification information of the component, or the location of the component in the computing device. Another implementation is where the method further includes initially powering-on the computing device. Identification information from the component is collected via a BIOS or BMC during the initial powering-on. The collected identification information is sent to the controller for performing the storing. Another implementation is where the identification data is determined by the BIOS or the controller collecting identification information from the component during a subsequent power-on of the computing device. Another implementation is where the identification is one of a serial number, a part number, a model ID, a manufacturer name or ID, a manufacture date, or a location in the computing device. Another implementation of the method includes periodically repeating the steps of determining the identification data of the component and checking whether the component has been replaced.

Another disclosed example is a computing device having hardware components. Each of the hardware components include identification data. At least one bus is coupled to the hardware components. A memory device stores identification information corresponding with each of the hardware components. A management controller is coupled to the bus and the memory device. The management controller is operable to periodically request identification data from each of the hardware components over the bus. The controller receives the requested identification data from each of the plurality of hardware components. The controller compares the received identification data with the stored identification data to determine if any of the hardware components has been replaced.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
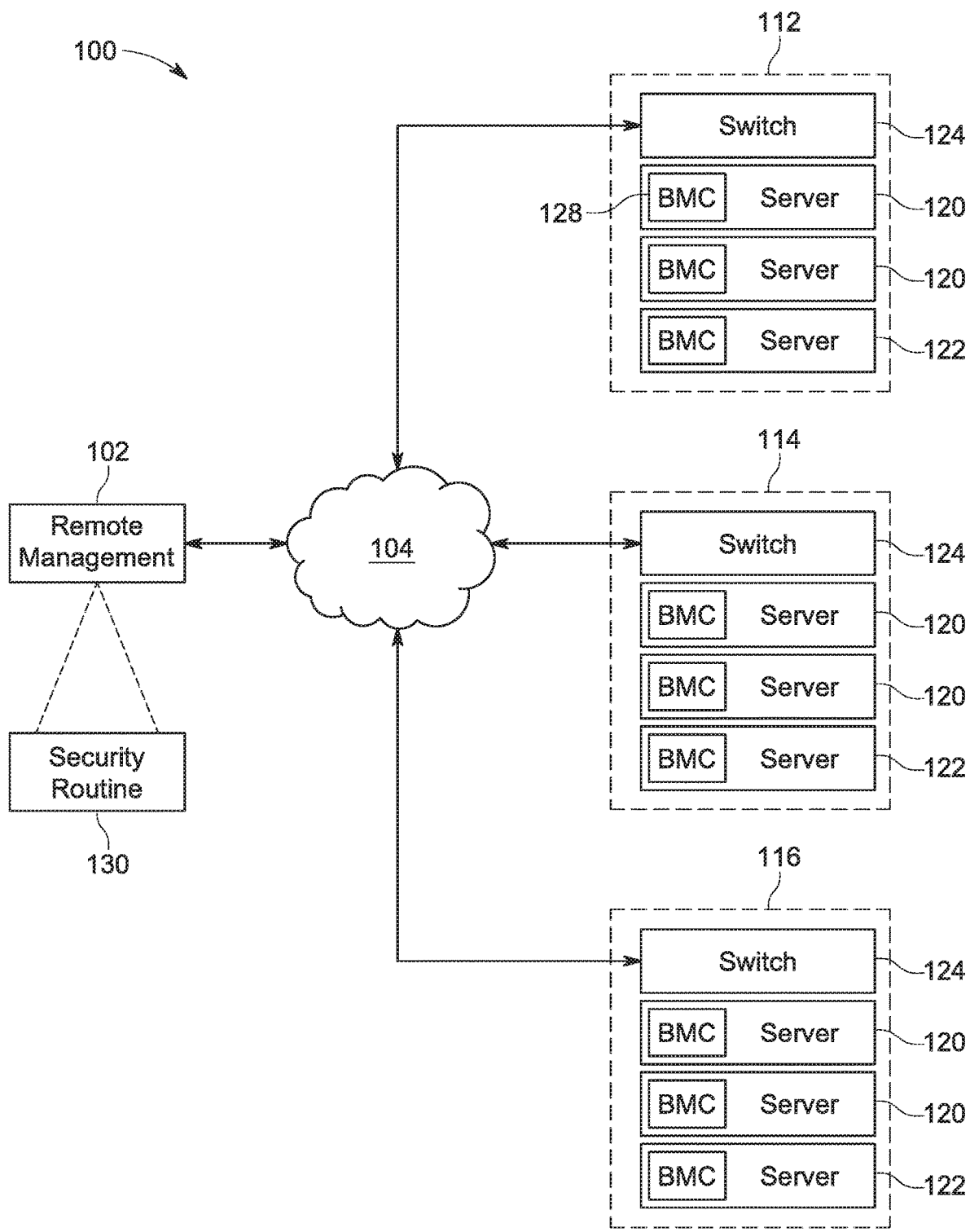
FIG. 1 is a block diagram of an example data center that allows a remote management station to track components of computing devices, according to certain aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The examples disclosed herein include a system and method that tracks the hardware components in computing devices. A management controller of a computing device, such as a server, periodically determines whether components in the computing device have been changed. The identification information for each component is collected by a BIOS or BMC during the power-on routine, and stored by the management controller. The management controller periodically obtains the identification information of each component and compares this identification information with the corresponding stored information. The system allows the management controller to alert an administrator if the collected identification information does not match the stored identification information for the components on the computing device.

FIG. 1 shows a data center system 100. The data center 100 includes a management station 102 that is connected through a network 104 to banks of servers on racks 112, 114, and 116. Each of the racks, such as the rack 112, includes computing devices such as application servers 120 and a storage server 122. The racks 112, 114, and 116 also each include a rack switch 124. In this example, the servers 120 and 122 may each include a dedicated controller, such as a baseboard management controller (BMC) 128, that may communicate operational data to the remote management station 102 via the rack switch 124 through the network 104. Each of the computing devices, such as the servers 120 and 122, checks the identification information for components of the computing device. In this example, the rack switch 124 includes connections to the BMC of each of the servers 120 and 122 to allow connection to the network 104.

There may be multiple racks other than the racks 112, 114, and 116 in the data center system 100. Even though only servers 120 and 122 are shown, it is to be understood that multiple servers of different types may be supported by each of the racks in the data center 100. The remote management station 102 may therefore monitor the operation of numerous servers on numerous racks.

An example security routine 130 may be executed on the management station 102 to ensure that the computing devices in the racks 112, 114, and 116 are not tampered with.

The security routine 130 is alerted by any of the computing devices when any of the components in the computing device is replaced. As will be explained, each of the computing devices includes a routine that periodically tracks the components by their identification data. The routine alerts the management station 102 of any change in components in the computing devices.

Example hardware components may include NICs (Network Interface Card), redundant array of inexpensive disks (RAID) cards, field programmable gate array (FPGA) cards, power supply units (PSU), hard disk drives (HDD), solid state drives (SSD), dual in-line memory modules (DIMM), central processing units (CPU), and graphic processing units (GPU). The BMC 128 on each of the computing devices alerts the security routine 130 if any components are replaced on that computing device. The security routine 130 alerts an operator and provides information such as the location of the computing device (both by rack and physical location), the component that has been replaced, and a timestamp.

Figure 2:
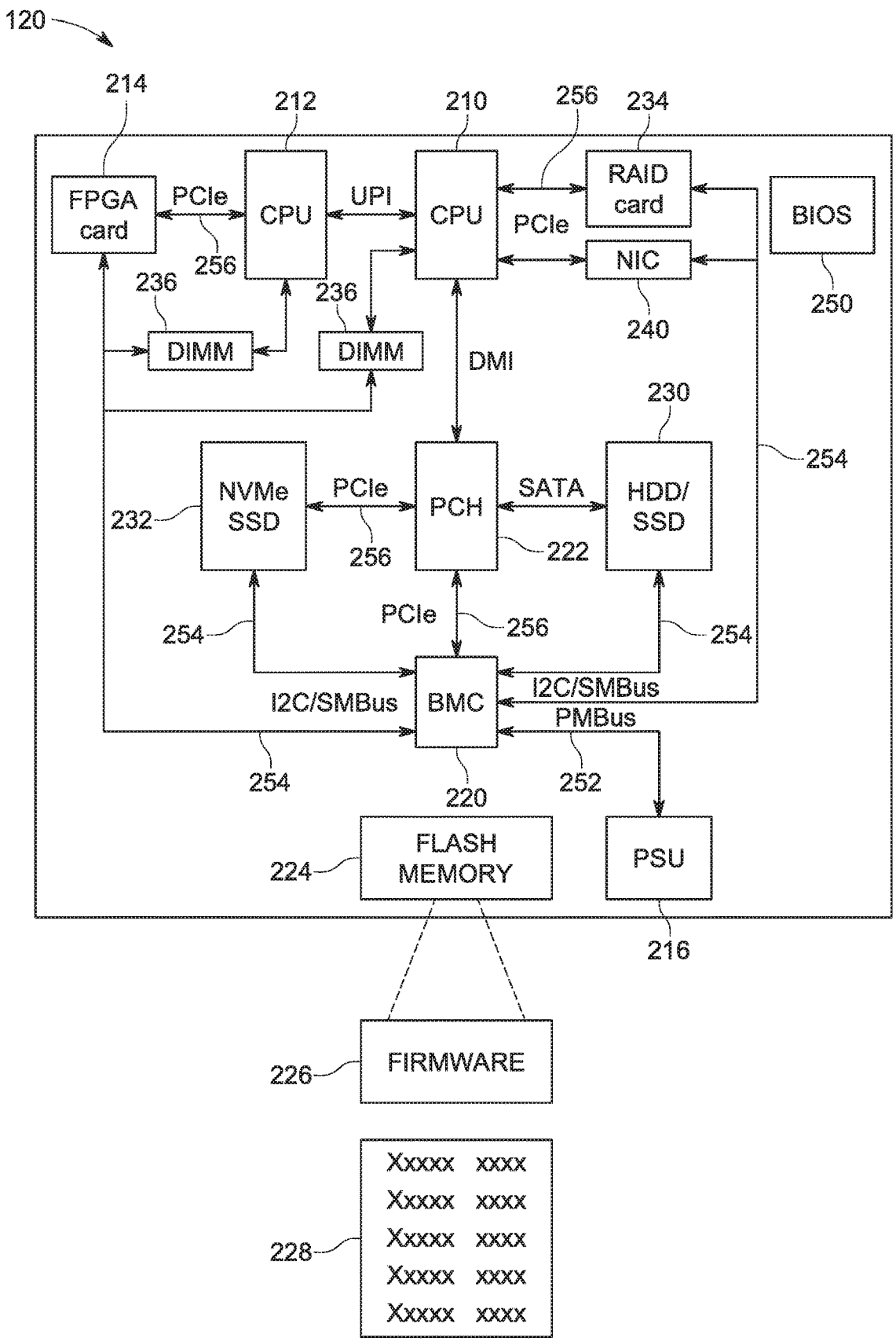
FIG. 2 is a block diagram of components of a computing device of the data center system in FIG. 1, including a management controller that can check identification information of components, according to certain aspects of the present disclosure.

FIG. 2 is a block diagram of an example computing device, such as the application server 120 in FIG. 1. The application server 120 includes two CPUs 210 and 212 that execute computing operations and applications. Although only two CPUs are shown, additional CPUs may be supported by the application server 120. Specialized functions may be performed by specialized processors such as a GPU or a field programmable gate array (FPGA) mounted on an FPGA card 214. The components on the application server 120 are powered by a PSU 216. The operation of the application server 120 is managed by a baseboard management controller (BMC) 220. A platform controller hub (PCH) 222 assists in controlling data paths and support for the CPUs 210 and 212. The BMC 220 is coupled to a non-volatile memory 224 that stores BMC firmware 226. A component identification table 228 is also stored in the non-volatile memory 224. In this example, the non-volatile memory 224 may be flash memory, but any appropriate non-volatile memory may be used.

Other components include memory devices such as a SATA memory device 230 that may be an HDD or a SSD, a non-volatile memory express (NVMe) SSD 232, and a RAID card 234. The CPUs 210 and 212 may be supported by fast memory in the form of DIMMs 236. A network interface card (NIC) 240 provides communication to external devices such as the remote management station 102 or switches and routers. A BIOS 250 is firmware used in a boot-up process after the application server 120 is powered-on. The BIOS 250 includes routines that collect information from the hardware components when such components are initialized as part of the boot-up process of the application server 120.

The application server 120 includes different buses that allow data to be exchanged between the components in the server 120. The busses also allow the BMC 220 to receive status information from different components in the application server 120. For example, the application server 120 may include a power management bus (PMBus) 252 that allows the BMC 220 to exchange power management data with the PSU 216. An inter-integrated circuit protocol system management bus (I2C/SMBus) 254 may be used to exchange data between the BMC 220 and devices such as the FPGA card 214, the SATA memory 230, the NVMe memory 232, the RAID card 234, and the DIMMs 236. A peripheral component interconnect express (PCIe) bus 256 allows exchange of data between processing components such as the CPUs 210 and 212, the PCH 222, the PCIe devices such as the NVMe SSD 232, the NIC 240, the RAID card 234, the FPGA card 214, and the BMC 220. Corresponding software protocols are used by the respective busses 252, 254, and 256. Other hardware busses such as I3C, PECI, UART, USB, or RMII/RGMII may be used. Other software protocols such as MCTP, NC-SI, PLDM, DCMI, and self-defined protocols may be used.

In the application server 120 in FIG. 2, the firmware 226 executed by the BMC 220 periodically collects identification information from each of the hardware components after the application server 120 powers-on. In this example, the firmware 226 causes the BMC 220 to send a command to each of the components to get identification information of the component via the hardware buses 252, 254, and 256. The identification information is sent through the respective software protocols to the BMC 220.

In this example, the component identification information may be a serial number, a part number, a model ID, a manufacturer name or ID, a manufacture date, or a location in the computing device. The identification information may be any single piece of information or a combination of the pieces of information. In this example, the serial number is the preferred identification but additional information may be helpful to the data center administrator. The identification information may be returned by the component in response to a command received from the BMC 220 over the appropriate bus. The collected component identification information may be compared by the firmware 226 to the stored component identification information in the component information table 228. Any difference in the collected information and the stored information indicates that a component has been replaced.

The initial information that is stored in the component information table 228 is collected by the BIOS 250 or the firmware 226 executed by the BMC 220 during the initial power-on routine of the application server 120. Certain identification information from components may only be obtained by either the BIOS 250 or the BMC 220 and therefore one or both the BIOS 250 or BMC 220 may collect the identification information. For example, the BIOS 250 can collect information exclusively from components that are only connected to the BIOS 250 such as memory devices exclusively connected via a SATA bus to a PCH such as the PCH 222. In another example, the BMC 220 may exclusively collect information from the PSU 216, which is not accessible by the BIOS 250. In this example, during the initial power-on routine, as part of BIOS UEFI procedures such as Pre-EFI initialization environment (PEI) or driver execution environment (DXE) during platform initialization, the BIOS 250 obtains identification information about each of the components. In this example, the BIOS 250 then sends the collected component identification information to the BMC 220 during the power-on routine. The BMC 220 stores the collected component identification information by writing it in the component information table 228. Alternatively, or in addition, the BMC 220 may collect identification information from the components during the initial power-on routine.

After the power-on routine and boot-up, the application server 120 is operational. During operation of the application server 120, the firmware 226 obtains the identification information for each component periodically, for example, every minute. The firmware 226 causes the BMC 220 to save the collected component identification information to the memory 224. The firmware 226 compares the collected component identification information with the corresponding component identification information in the component identification table 228. The BMC 220 logs this event to the non-volatile memory 224 if any of the information does not match the saved information (e.g. serial numbers are different), as this indicates a replacement of the original component. The firmware 226 also generates an alert when the information does not match the table 228. The alert is sent to the security routine 130 in FIG. 1 to alert the data center operator. Alternatively, the security routine 130 may send a reply to the BMC 220 that the replacement of the component is authorized. If the security routine 130 sends an authorization reply, the BMC 220 will update the component table 228 with the new identification information of the replaced component.

On subsequent power-ons of the application server 120, the power-on routine BIOS 250 sends information for each component in the application server 120 to the BMC 220 as explained above. In addition, or alternatively, component information may also be collected by the BMC 220 during power-on. The firmware 226 causes the BMC 220 to compare the collected identification information for each component from the BIOS 250 with the corresponding saved identification information in the component table 228. If the compared result is not the same, the BMC 220 will determine that the component is changed. The BMC 220 logs this event to a log stored in the memory 224. The BMC 220 also alerts an administrator or user such as an operator of the remote management station 102.

The alert may be made in several formats. The alert may be in an IPMI PET (Platform Event Trap) protocol and format. The alert may be in a SNMP trap protocol and format. The alert may be in the form of Email (SMTP) protocol. The event message may be in the form of a text message to a mobile phone text message server which then sends the text message to the administrator's phone.

The alert message may contain useful information including a timestamp, the IP address of the BMC, the computing device (e.g. server) ID, the component name or ID, the difference of information relating to the replaced component and the original component, and the location of the flagged component inside the computing device. Any or all of the information may be included in the alert message with other useful information.

For example, the memory device 230 may be an Intel SATA SSD having a product ID of INTEL SSDSC2KG96 and a serial number of BTYG937001DV960CGN00. On initial power-on, the BIOS 250 collects this serial number and product ID identification information stores it in the component identification table 228. The BMC 220 then collects the serial number identification from the memory device 230 via the RAID card 234 periodically and compares it to the stored serial number. If the collected serial number is different, the BMC 220 generates an alert that the memory device 230 has been replaced.

Similarly, the NVMe device 232 may be an Intel PCIe SSD (NVMe) having a serial number of 55-cd-2e-41-4d-26-e9-a8 and a physical slot of 17. On initial power-on, the BMC 220 collects this identification information and stores it in the component identification table 228. The BMC 220 then collects the serial number identification and slot number from the NVMe memory device 232 periodically and compares it to the stored serial number and slot number. If the collected serial number or slot number is different, the BMC 220 generates an alert that the NVMe memory device 232 has been replaced.

Another example may be the NIC card 240, which may be a Mellanox NIC having a part number of MCX456A-ECAT, and a serial number of MT1750K08257. On initial power-on, the BMC 220 collects this identification information and stores it in the component identification table 228. The BMC 220 then collects the serial number identification and part number from the NIC card 240 periodically and compares it to the stored serial number and part number. If the collected serial number or part number is different, the BMC 220 generates an alert that the NIC 240 has been replaced.

Figure 3:
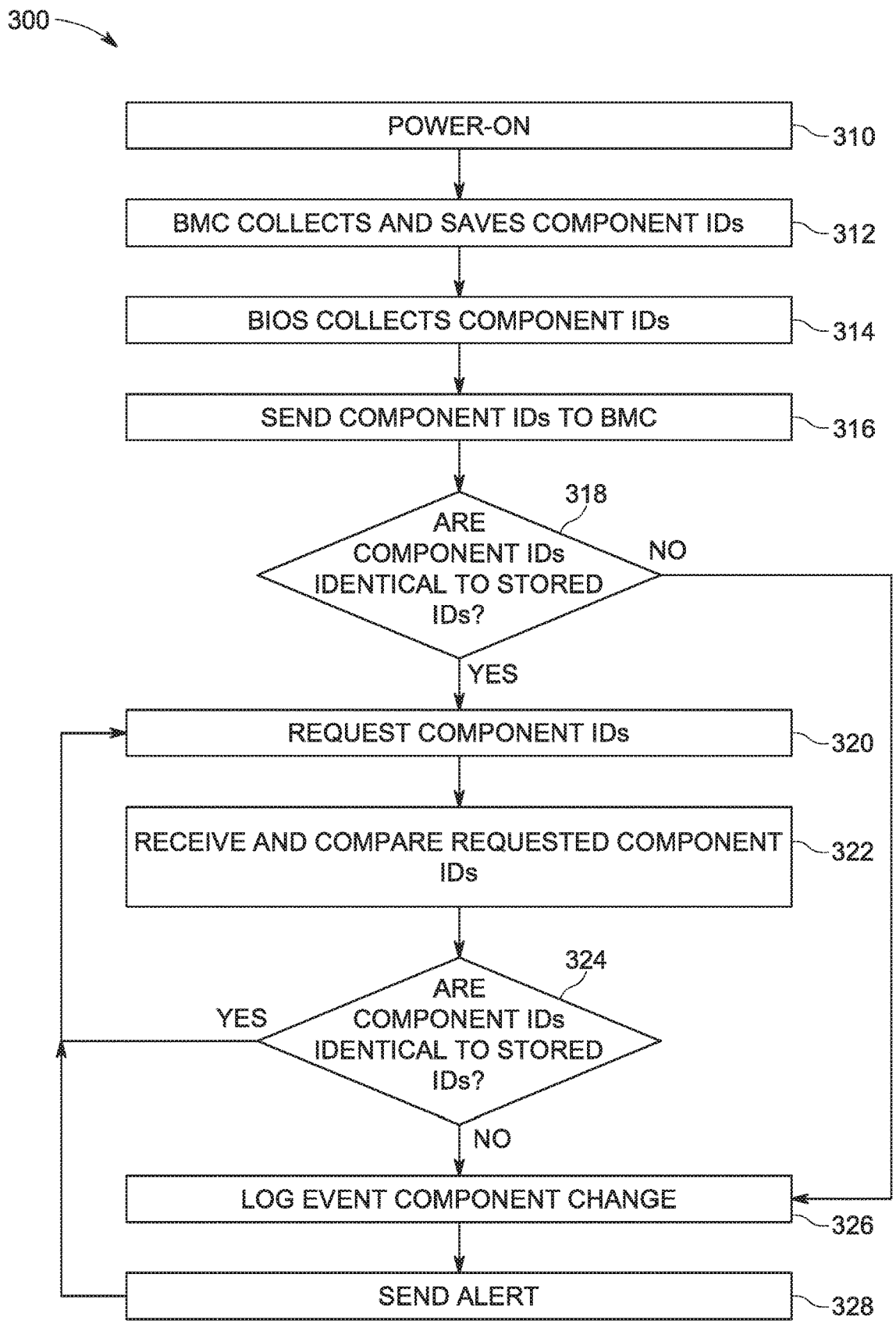
FIG. 3 is a flow diagram of an example routine to periodically check the identification information of the components of a computing device, according to certain aspects of the present disclosure.
Figure 4:
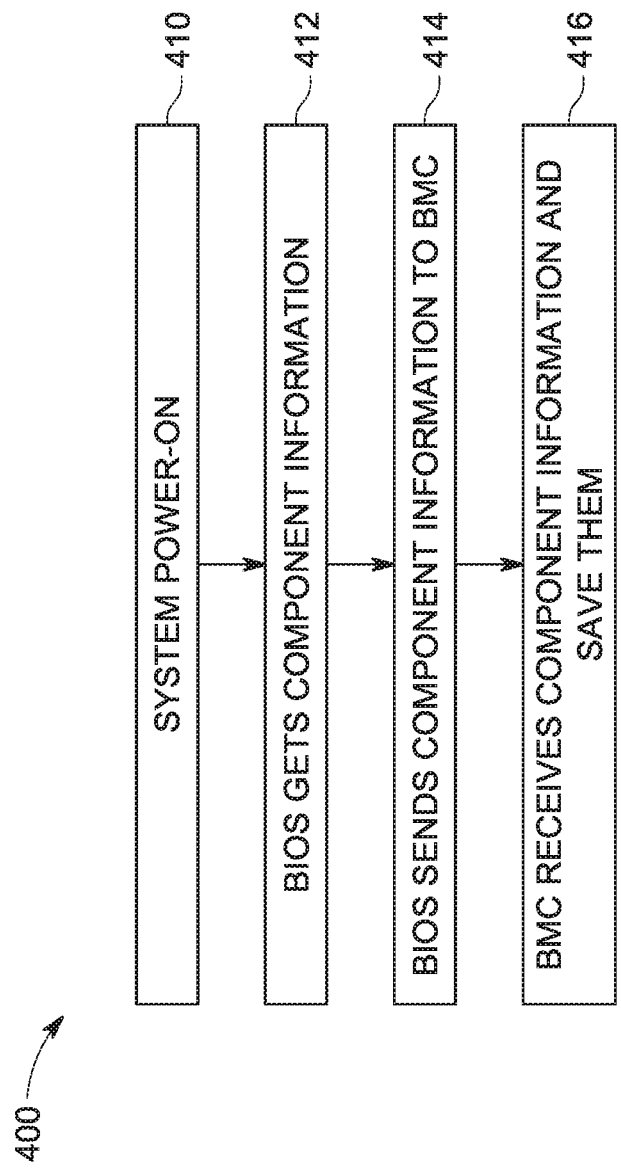
FIG. 4 is a flow diagram of an example start-up routine of a BIOS and BMC to determine the identification information of components in a computing device, according to certain aspects of the present disclosure.

Flow diagrams in FIGS. 3-4 are representative of example machine readable instructions for the periodic check of component identification and check on power-on in the application server 120 in FIG. 2. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 3-4, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The routine of the flow diagram 300 in FIG. 3 begins when the computing device such as the application server 120 in FIG. 2 is powered-on (310). The BMC 220 collects the identification information data from each of the hardware components during the power-on routine and stores in the component identification table 228 (312). The BIOS 250 collects the identification information data from each of the hardware components during the power-on routine (314). The identification information data is sent to the BMC 220 and added to the identification information collected by the BMC 220 (316). The BMC 220 compares the collected information data to the information data stored in the component table 228 in the memory 224 (318).

If the collected information data matches the stored information data, the BMC 220 then periodically requests identification information from each of the hardware components over the various busses such as busses 252, 254, and 256 during normal operations (320). The BMC 220 then compares the received identification information for each component with the stored identification information from the memory 224 (322). If the identification information for each component is identical (324), the routine loops back for the periodic collection of the identification information (320).

If the received identification information for any of the components differs from the identification information stored in the memory 224, either after power-on (318) or during the periodic collection (320), this indicates the component has been replaced. The BMC 220 then logs an event that the component has been changed (326). The BMC 220 then sends an alert to the administrator such as through a communication to the remote management station 102 in FIG. 1 (328). In this manner, the administrator may be alerted of potential tampering of the computing device. The routine then loops back to the periodic collection of the identification information (320).

FIG. 4 shows a flow diagram 400 of the process of the BIOS 250 and the BMC 220 on initial power-on to collect and store the identification of each of the components in a computing device, such as the application server 120 in FIG. 2. The computing device first powers-on (410). The BIOS 250 is activated and collects identification information from each component as part of the initialization routine (412). The BIOS 250 sends the identification information to the BMC 220 (414). The BMC 220 receives the component information and creates the component table 228. The BMC 220 then populates the component table 228 with the component and corresponding component identification information (416)

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system to determine components of a remote computing device, the system comprising:
    a remote management station;
    a network in communication with the remote management station; and
    a computing device having a memory, a controller, a basic input output system (BIOS), and a plurality of hardware components, wherein the BIOS collects identification information from at least one of the hardware components during an initial power-on of the computing device wherein the memory stores identification data for at least one of the hardware components collected by the BIOS during the initial power-on, and the controller is coupled to the network, wherein during operation of the computing device after the initial power-on, the controller periodically determines the identification data of at least one of the hardware components, and periodically checks whether the component has been replaced by comparing the stored identification data collected by the BIOS with the determined identification data.

2. The system of claim 1, wherein the controller is a baseboard management controller.

3. The system of claim 1, wherein the computing device is a server.

4. The system of claim 1, wherein controller issues an alert to the remote management station when the component has been replaced.

5. The system of claim 4, wherein the alert is one of an email, a text message, an IPMI PET (Platform Event Trap) protocol alert, or a SNMP trap protocol alert.

6. The system of claim 4, wherein the alert may include one of a timestamp, an IP address of the controller, an ID of the computing device, the stored identification information of the component, the determined identification information of the component, or the location of the component in the computing device.

7. The system of claim 1, wherein the identification data is determined by the BIOS collecting identification information from the component during a subsequent power-on of the computing device.

8. The system of claim 1, wherein the identification is one of a serial number, a part number, a model ID, a manufacturer name or ID, a manufacture date, or a location in the computing device.

9. A method of determining components on a computing device comprising:
    collecting identification information from at least one of a plurality of hardware components of the computing device via a basic input output system (BIOS) or the controller of the computing device during an initial power-on of the computing device;
    storing the collected identification information of the at least one of a plurality of hardware components in a memory of the computing device;
    subsequently periodically determining the identification information of the at least one hardware component during operation of the computing device via the controller of the computing device; and periodically checking the determined identification information of the at least one hardware component with the stored identification information collected by the BIOS or the controller to determine if the component has been replaced.

10. The method of claim 9, wherein the controller is a baseboard management controller and the computing device is a server.

11. The method of claim 9, further comprising issuing an alert when the component has been replaced.

12. The method of claim 11, wherein the alert is one of an email, a text message, an IPMI PET (Platform Event Trap) protocol alert, or a SNMP trap protocol alert.

13. The method of claim 11, wherein the alert may include one of a timestamp, an IP address of the controller, an ID of the computing device, the stored identification information of the component, the determined identification information of the component, or the location of the component in the computing device.

14. The method of claim 9, wherein the identification information is one of a serial number, a part number, a model ID, a manufacturer name or ID, a manufacture date, or a location in the computing device.

15. A computing device comprising:
a plurality of hardware components, each of the hardware components including identification data;
at least one bus coupled to the plurality of hardware components;
a memory device for storing identification information corresponding with each of the plurality of hardware components collected during an initial power-on of the computing device; and
a management controller coupled to the at least one bus and the memory device, the management controller operable to:
collect identification information from each of the plurality of hardware components over the at least one bus during the initial power-on of the computing device;
storing the identification information collected from each of the plurality of hardware components during the initial power-on of the computing device in the memory device;
periodically request identification data from each of the plurality of hardware components over the at least one bus during operation of the computing device;
receive the requested identification data from each of the plurality of hardware components; and
periodically compare the received identification data with the stored identification data collected from each of the plurality of hardware components during the initial power-on of the computing device stored in the memory device to determine if any of the plurality of hardware components has been replaced during operation of the computing device.

16. The computing device of claim 15, wherein the controller is a baseboard management controller and the computing device is a server.

17. The computing device of claim 15, wherein management controller is further operable to issue an alert to a remote management station via a network when any of the hardware components has been replaced.

18. The computing device of claim 17, wherein the alert is one of an email, a text message, an IPMI PET (Platform Event Trap) protocol alert, or a SNMP trap protocol alert.

19. The computing device of claim 17, wherein the alert may include one of a timestamp, an IP address of the controller, an ID of the computing device, the stored identification information of the component, the determined identification information of the component, or the location of the component in the computing device.

20. The computing device of claim 15, wherein the identification is one of a serial number, a part number, a model ID, a manufacturer name or ID, a manufacture date, or a location in the computing device.

* * * * *